United States Patent [19]
Rebrovic

[11] Patent Number: 6,048,958
[45] Date of Patent: Apr. 11, 2000

[54] PROCESS FOR THE PRODUCTION OF DIKETO DINITRILES AND POLYMERS DERIVED THEREFROM

[75] Inventor: Louis Rebrovic, Shandon, Ohio

[73] Assignee: Henkel Corporation, Gulph Mills, Pa.

[21] Appl. No.: 09/201,343

[22] Filed: Dec. 1, 1998

[51] Int. Cl.[7] ..................................................... C08G 63/44
[52] U.S. Cl. ........................ 528/288; 528/272; 528/489; 528/503
[58] Field of Search ................................. 528/288, 272, 528/489, 503

[56] References Cited

U.S. PATENT DOCUMENTS 2,853,509  9/1958  Sutherland et al. .

*Primary Examiner*—Duc Truong
*Attorney, Agent, or Firm*—John E. Drach; Peter G. Dilworth

[57] ABSTRACT

Diketo dinitriles are produced from the reaction of a diester and a nitrile in the presence of an alkali metal base. Polymers derived from the diketo dinitriles are useful as molding resins.

18 Claims, No Drawings

PROCESS FOR THE PRODUCTION OF DIKETO DINITRILES AND POLYMERS DERIVED THEREFROM

BACKGROUND OF THE INVENTION

This invention relates to a process for the production of diketo dinitriles, in particular, diketo dinitriles such as 3,11-dioxotridecanedinitrile (1,11-dicyanoundecane-2,10-dione) and to polymers derived therefrom.

U.S. Pat. No. 2,853,509 describes a process for the production of diketo dinitriles, or di-β-ketonitriles as they may also be called, of the general formula

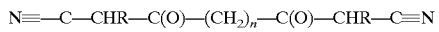

wherein R is hydrogen, phenyl or alkyl and wherein n is an integer of from 1 to 8. The diketo dinitriles are produced by reacting in liquid ammonia the sodium derivative of a nitrile of the general formula

wherein R possesses one of the aforestated meanings with a diester of the formula

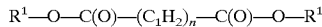

wherein $R^1$ is alkyl of from 1 to 12 carbon atoms and n possesses the aforestated meaning. This process requires the use of liquid ammonia which must be kept at temperatures of −33° C. or lower to remain in the liquid state. This requirement alone makes the process undesirable as an industrial synthesis. Another drawback to the process of U.S. Pat. No. 2,853,509 is that it employs sodium metal to make sodamide which in turn is used to make the aforementioned nitrile reactant. Sodium metal poses a severe fire risk and requires elaborate precautions for its safe storage and handling.

Accordingly, there has heretofore been a need for a method for the production of diketo dinitriles which does not require the use of liquid ammonia and/or sodium metal.

SUMMARY OF THE INVENTION

In accordance with the present invention, there is provided a process for the production of a diketo dinitrile of the general formula

wherein $R^1$ is hydrogen, phenyl or alkyl of from 1 to about 6 carbon atoms and n is an integer of from about 6 to about 18 which comprises reacting a diester of the general formula $$R^2-O-C(O)-(CH_2)_n-C(O)-O-R^2$$

wherein $R^2$ is alkyl of from 1 to about 6 carbon atoms and n possesses the aforestated meaning, with a nitrile of the general formula

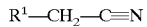

wherein $R^1$ possesses the aforestated meaning in the presence of an alkali metal base to provide a dialkali metal salt of a diketo dinitrile of the formula

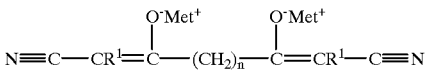

wherein Met is an alkali metal and thereafter acidifying the salt to provide the product diketo dinitrile.

Further in accordance with this invention, the product diketo dinitrile can be reacted with itself or with a difunctional compound such as a dialdehyde, diol, dicarboxylic acid or diester to provide polymers useful as molding resins.

Unlike the process for the production of diketo dinitriles described in U.S. Pat. No. 2,853,509, the process of this invention avoids the use of liquid ammonia and metallic sodium.

DESCRIPTION OF THE PREFERRED EMBODIMENTS

Many of the starting diesters that can be utilized herein are commercially available and/or can be prepared from commercially available reactants employing known and conventional synthesis procedures, e.g., esterification of the corresponding dicarboxylic acid with a monoalkanol of from 1 to about 6 carbon atoms. Among the useful diesters that can be used herein are the alkyl diesters, in particular, the methyl-, ethyl-, propyl- and isopropyl-diesters of heptanedioic (pimelic), octanedioic (suberic), nonanedioic (azelaic), docanedioic (sebacic), undecanedioic, dodecanedioic, tridecanedioic (brassylic) and tetradecanedioic acids. Of these diesters, the methyl-, ethyl-, propyl- and isopropyl-diesters of nonanedioic acid and octanedioic acid are preferred.

Useful nitriles include acetonitrile, propionitrile, butyroxitrile, valeronitrile, capronitrile, phenyl acetonitrile, and the like, acetonitrile being preferred.

The reaction of diester and nitrile is carried out in the presence of an alkali metal base, preferably an alkali metal alkoxide. Suitable alkali metal alkoxides include the lithium and sodium methoxides, ethoxides, propoxides and isopropoxides. Of these, the lithium and sodium methoxides are preferred. The alkoxides can be used as such or as a solution, e.g., a 25–50 weight percent solution of sodium methoxide in methanol. Stoichiometric amounts of alkali metal base should generally be employed, e.g., in a mole ratio of at least about 2:1 relative to the starting diester.

In carrying out the process of this invention, it is preferred to employ a solvent. As a matter of convenience, it is preferred to utilize the nitrile reactant, e.g., acetonitrile, as the solvent. In such case, the nitrile can be present in a large stoichiometric excess, e.g., a mole ratio of nitrile to diester of from about 10:1 to about 60:1.

The components of the reaction mixture can be combined in any order or all at once. Thus, e.g., the preferred lithium methoxide or sodium methoxide base can be introduced into a suitably equipped reactor followed by the addition of a large excess of nitrile and the mixture heated for up to about an hour under reflux in order to effect mixing. Thereafter the diester-can be added to the reactor, preferably slowly and accompanied by stirring, with the reaction mixture being continuously heated under reflux for about 2 to about 4 hours. The resulting dilithium or disodium salt can be acidified in situ with a suitable acidifying agent, e.g., a strong mineral acid such as hydrochloric acid, to yield the desired diketo dinitrile or the salt can be recovered and acidified in a separate reactor.

Alternatively, all components of the reaction mixture, i.e., diester, nitrile and alkali metal base, can be combined and heated under reflux to yield the salt of the diketo dinitrile which is then acidified in situ or in a separate reactor as previously described to provide the product diketo dinitrile.

The diketo dinitriles of this invention when heated above their melting points provide highly crosslinked infusible polymers. The diketo dinitriles will also copolymerize with a variety of difunctional compounds, e.g., dialdehydes such as glutaraldehyde, adipaldehyde, terephthaldicarboxaldehyde, etc., diols such as ethylene glycol, propylene glycol, butanediol, pentanediol, hexanediol, nonanediol, etc., dicarboxylic acids such as propanedioic and butanedioic acid, pentanedioic acid, hexanedioic acid, heptanedioic acid, octanedioic acid, nonanedioic acid, etc., diesters such as the methyl and ethyl esters of any of the foregoing dicarboxylic acids, and diisocyanates such as MDI, TDI, etc. The polymers obtained from the diketo dinitriles of this invention are useful, inter alia, as molding resins.

The following examples are illustrative of the invention.

EXAMPLE 1

To an oven dried 500 Ml 3-necked round bottom flask fitted with a mechanical stirrer, reflux condenser with drying tube and pressure equalizing addition funnel was added 11.7g (95%; 0.205 mole) sodium methoxide followed by 300 mL of acetonitrile all at once. The mixture was stirred and heated under reflux. To this was added 21.6 g (0.100 mole) of dimethyl azelate (dimethylnonanedioate) over 4 hours. The mixture was heated under reflux for an additional 20 hours. Afterwards, the reaction mixture, containing the disodium salt of 3,11-dioxotridecanedinitrile, was cooled to room temperature and then acidified by being poured into 1000 g of cracked ice and water with approximately 21 mL of concentrated HCl. The resulting solid was filtered off, washed with 2×200 mL water and dried by subjecting the solid to 10 mm of vacuum and air drying at room temperature until a constant weight was achieved. A yield of 18.17 g (93% purity) 3,11-dioxotridecanedinitrile was obtained with a yield of 72%.

3,11-Dioxotridecanedinitrile can be recrystallized in methanol to give a purity of greater than 99%. For example, 54.2 g of crude 3,11-dioxotridecanedinitrile was recrystallized in 750 mL of methanol (heated to reflux and cooled to room temperature) to give 30.75 of ~99% product. The mother liquor was cooled to −10° C. and yielded another 7.11 g of 99% material.

EXAMPLE 2

The procedure of Example 1 was repeated except that after all of the components of the reaction medium were added and allowed to reflux for a total of 22 to 24 hours, the mixture was cooled to room temperature and the solids were filtered off prior to acidification. The solids were partially vacuum dried and then added to 500 g of cracked ice and water containing 21 mL of concentrated HCl. The resulting product was filtered off and washed with 2×50 ml of water, vacuum dried and allowed to further air dry until a constant weight was obtained. A yield of 18.0 gms (89% pure) of 3,11-dioxotridecanedinitrile was obtained with a molar yield of 68%.

EXAMPLE 3

Example 1 was repeated except that 27.2 g (0.100 mole) of diisopropylazelate was used instead of dimethylazelate. 3,11-Dioxotridecanedinitrile was obtained in a molar yield of 51%.

EXAMPLE 4

Example 2 was repeated except that 27.2 g (.100 mole) of diisopropylazelate was used instead of dimethylazelate. 3,11-Dioxotridecanedinitrile was obtained in a yield molar of 48%.

EXAMPLE 5

Example 2 was repeated except that 41.3 g (0.100 mole) of di-(2-ethylhexyl)azelate was used instead of dimethylazelate. 3,11-Dioxotridecanedinitrile was obtained in a yield of 53%.

EXAMPLE 6

Example 1 was repeated except that 20.2 g (0.100 mole) of dimethyl suberate (dimethyloctanedioate) was used instead of dimethyl azelate. The dimethyl suberate was added over 5 hours and allowed to reflux for an additional 16 hours instead of 20 hours. The molar yield of 3,10-dioxododecanedinitrile following methanol recrystallization was 29%.

EXAMPLE 7

In a small vial, 0.23 g of 3,11-dioxotridecanedinitrile and 0.13 g of terephthaldicarboxaldehyde were mixed thoroughly and heated at 160° C. for 12 minutes to provide an apparently cross-linked polymer possessing the following properties:

Number Average Molecular Weight=2300

Weight Average Molecular Weight=5520

Peak Molecular Weight=4400

EXAMPLE 8

In a small vial, 0.428 g of 3,11-dioxotridecanedinitrile was heated to 160° C. for 1 hour to provide an apparently cross-linked polymer containing units of 4-amino-2,6-dialkylpyrimidine.

EXAMPLES 9–15

In a manner similar to Example 7, 3,11-dioxotridecanedinitrile was copolymerized with other difunctional compounds under the temperature and time conditions indicated below:

| Example | 3,11-dioxotri-decanedinitrile, moles | Difunctional Compound, moles | Temp., ° C. | Minutes |
|---|---|---|---|---|
| 9  | 1.0 | azelaic acid, 1 mole | 160 | 30 |
| 10 | 1.0 | azelaic acid, 1 mole | 120 | 30 |
| 11 | 1.0 | 1,9-nonanediol, 1 mole | 160 | 30 |
| 12 | 1.0 | 1,9-nonanediol, 1 mole | 120 | 30 |
| 13 | 1.0 | octadecanedioic acid, 1 mole | 160 | 30 |
| 14 | 1.0 | octadecanedioic acid, 1 mole | 120 | 30 |
| 15 | 1.0 | azelaic acid, 1 mole dimethyl azelate, 0.22 moles | 120 | 60 |

Each example resulted in a hard polymer.

What is claimed is:

1. A process for the production of a diketo dinitrile of the general formula $$N\equiv C-CHR^1-C(O)-(CH_2)_n-C(O)-CHR^1-C\equiv N$$

wherein $R^1$ is hydrogen, phenyl or alkyl of from 1 to about 6 carbon atoms and n is an integer of from about 6 to about 18 which comprises reacting a diester of the general formula $$R^2-O-C(O)-(CH_2)_n-C(O)-O-R^2$$

wherein $R^2$ is alkyl of from 1 to about 6 carbon atoms and n possesses the aforestated meaning, with a nitrile of the general formula $$R^1-CH_2-C\equiv N$$

wherein $R^1$ possesses the aforestated meaning in the presence of an alkali metal base to provide a dialkali metal salt of a diketo dinitrile of the formula $$N\equiv C-CR^1=\underset{\underset{O^-Met^+}{|}}{C}-(CH_2)_n-\underset{\underset{O^-Met^+}{|}}{C}=CR^1-C\equiv N$$

wherein Met is an alkali metal and thereafter acidifying the salt to provide the product diketo dinitrile.

2. The process of claim 1 wherein the diester is the methyl-, ethyl-, propyl- or isopropyl- diester of a dicarboxylic acid selected from the group consisting of heptanedioic acid, octanedioic acid, nonanedioic acid, decanedioic acid, undecanedioic acid, dodecanedioic acid, tridecanedioic acid and tetradecanedioic acid.

3. The process of claim 1 wherein the nitrile is selected from the group consisting of acetonitrile, propionitrile, butyronitrile, valeronitrile, capronitrile and phenyl acetonitrile.

4. The process of claim 1 wherein the base is an alkali metal alkoxide.

5. The process of claim 1 wherein the base is a lithium or sodium methoxide, ethoxide, propoxide or isopropoxide.

6. The process of claim 1 carried out in a solvent.

7. The process of claim 1 carried out in a large stoichiometric excess of nitrile reactant as solvent.

8. The process of claim 1 wherein acidification of the salt is carried out with a strong mineral acid.

9. The process of claim 1 wherein the diester is the methyl-, ethyl-, propyl- or isopropyl- diester of a dicarboxylic acid selected from the group consisting of heptanedioic acid, octanedioic acid, nonanedioic acid, decanedioic acid, undecanedioic acid, dodecanedioic acid, tridecanedioic acid and tetradecanedioic acid, the nitrile is selected from the group consisting of acetonitrile, propionitrile, butyronitrile, valeronitrile, capronitrile and phenyl acetonitrile and the base is an alkali metal alkoxide.

10. The process of claim 1 wherein the diester is dimethylnonanedioate or dimethyoctanedioate, the nitrile is acetonitrile and the base is lithium methoxide, sodium methoxide, lithium ethoxide or sodium ethoxide.

11. A polymer containing units derived from a diketo dinitrile of the general formula $$N\equiv C-CHR^1-C(O)-(CH_2)_n-C(O)-CHR^1-C\equiv N$$

wherein $R^1$ is hydrogen, phenyl or alkyl of from 1 to about 6 carbon atoms and n is an integer of from about 6 to about 18.

12. The polymer of claim 11 obtained by heating the diketo dinitrile at a temperature above its melting point.

13. The polymer of claim 11 obtained by the condensation polymerization of the diketo dinitrile and a compound possessing at least two functional groups each of which reacts with the nitrile groups of the diketo dinitrile under condensation polymerization conditions.

14. The polymer of claim 13 wherein the diketo dinitrile is reacted with a difunctional compound selected from the group consisting of dialdehyde, diol, dicarboxylic acid, diester, diisocyanate and mixtures of any of the foregoing.

15. The polymer of claim 11 derived from 3,11-dioxotridecanenitrile.

16. The polymer of claim 12 derived from 3,11-dioxotridecanenitrile.

17. The polymer of claim 13 derived from 3,11-dioxotridecanenitrile.

18. The polymer of claim 14 derived from 3,11-dioxotridecanenitrile.

* * * * *